(12) United States Patent
Granstrom et al.

(10) Patent No.: US 11,747,803 B2
(45) Date of Patent: Sep. 5, 2023

(54) REMOTE CONTROL STATION AND METHOD OF OPERATING REMOTE CONTROL STATION

(71) Applicant: Caterpillar Inc., Peoria, IL (US)

(72) Inventors: Jonathan Granstrom, Eureka, IL (US); Justin Peters, Clayton, NC (US); Timothy J. Felty, East Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 186 days.

(21) Appl. No.: 17/156,880

(22) Filed: Jan. 25, 2021

(65) Prior Publication Data

US 2022/0236731 A1 Jul. 28, 2022

(51) Int. Cl.
*G05D 1/00* (2006.01)

(52) U.S. Cl.
CPC ......... *G05D 1/0016* (2013.01); *G05D 1/0022* (2013.01); *G05D 1/0033* (2013.01); *G05D 2201/0202* (2013.01)

(58) Field of Classification Search
CPC .. G05D 1/0016; G05D 1/0022; G05D 1/0033; G05D 2201/0202
See application file for complete search history.

(56) References Cited

U.S. PATENT DOCUMENTS

| 8,437,920 | B2 | 5/2013 | Hobenshield et al. | |
|---|---|---|---|---|
| 9,804,595 | B1* | 10/2017 | Denard | B64C 39/024 |
| 10,795,351 | B2* | 10/2020 | Hurd | G05D 1/0297 |
| 2006/0064221 | A1 | 3/2006 | Sporer et al. | |
| 2014/0214240 | A1* | 7/2014 | Funke | G05D 1/0027 |
| | | | | 701/2 |
| 2016/0032564 | A1 | 2/2016 | Pinther, II et al. | |
| 2017/0060128 | A1* | 3/2017 | Matloff | G05D 1/0016 |
| 2019/0072984 | A1* | 3/2019 | Dougherty | B64C 39/024 |
| 2019/0155237 | A1* | 5/2019 | Kean | G05B 19/0423 |
| 2020/0387297 | A1* | 12/2020 | Wheeler | G06F 3/04817 |

FOREIGN PATENT DOCUMENTS

| EP | 0480036 | 3/1993 | |
|---|---|---|---|
| KR | 20080059792 | 2/2009 | |
| WO | WO-2018058310 A1 * | 4/2018 | G05D 1/101 |

OTHER PUBLICATIONS

Miao, machine translation of WO-2018058310-A1 (Year: 2018).*

* cited by examiner

*Primary Examiner* — Anne Marie Antonucci
*Assistant Examiner* — Patrick Daniel Mohl

(57) ABSTRACT

A remote control station includes an operator interface for remotely controlling at least one work operation. The operator interface includes at least one control device and an indication system having a first symbol associated with a plurality of control patterns of the at least one control device. The operator interface further includes a display device configured to display a plurality of control patterns thereon. Each of the plurality of control patterns includes a second symbol substantially similar to the first symbol. The remote control station also includes a controller configured to store the plurality of control patterns associated with the at least one control device. The controller is configured to receive an input signal from the operator interface for activation of one of the plurality of control patterns and transmit an output signal for performing the at least one work operation.

20 Claims, 8 Drawing Sheets

REMOTE CONTROL STATION AND METHOD OF OPERATING REMOTE CONTROL STATION

TECHNICAL FIELD

The present disclosure relates to remote controlling of machines, and more specifically, to a remote control station and a method of operating the remote control station for controlling various machines.

BACKGROUND

A machine, such as a loader or an excavator, operates at a worksite to accomplish various work operations. The machine may have to travel to a specific worksite and one or more implements of the machine may have to be operated for accomplishing the work operations. With advancement in technology, it is possible for an operator to remotely control the machine from a base station. Such a capability of remotely controlling the machine is specifically desirable in challenging work environments.

The base station typically includes a remote control station. Such a remote control station includes an operator interface having various input/output devices and a controller that communicates with the operator interface and the machine. Further, the input devices on the operator interface may include a joystick, a lever, a knob, a switch, a button, or any other device that is movable between various positions for operating the machine.

Different machines and implements may use different movements of the input device to control the corresponding machine and/or implement. Specifically, the input devices of different machines and/or implements may have different control patterns to perform a particular work operation. It can be difficult for the operator who is familiar with one control pattern to use a machine and/or an implement having a different control pattern. It may be beneficial for the operator present at the base station to have the ability to change the control patterns while remotely controlling the machine.

Further, in order to comply with industrial standards, it is desirable that a signage for a current control pattern is depicted on the operator interface. Typically, the signage is provided on a face plate of the operator interface. It may be challenging and confusing to illustrate different control patterns on the face plate due to space constraints. Thus, multiple part numbers for the face plate are required for different control patterns. Currently, the face plates on the operator interface are swapped to illustrate the signage for the current control pattern which may increase operator effort.

U.S. Publication Application Number 2006/0064221 describes a method and apparatus of a work machine wherein the operator changes the control pattern of the work machine by selecting the control pattern from a plurality of control patterns stored in a controller. A first input device is actuated to select a predetermined control pattern for at least one control member. The controller enables an algorithm to change from a first control pattern to a second control pattern in response to the selected predetermined control pattern.

SUMMARY OF THE DISCLOSURE

In one aspect of the present disclosure, a remote control station is provided. The remote control station includes an operator interface for remotely controlling at least one work operation. The operator interface includes at least one control device. The operator interface also includes an indication system disposed adjacent to the at least one control device, wherein the indication system includes a first symbol associated with a plurality of control patterns of the at least one control device. The operator interface further includes a display device configured to display the plurality of control patterns thereon. Each of the plurality of control patterns includes a second symbol that is substantially similar to the first symbol. The remote control station also includes a controller operatively coupled with the operator interface. The controller is configured to store the plurality of control patterns therein. The controller is configured to receive an input signal from the operator interface for activation of one of the plurality of control patterns. The controller is also configured to transmit an output signal for performing the at least one work operation based on the activated control pattern.

In another aspect of the present disclosure, a remote control station is provided. The remote control station includes an operator interface for remotely controlling at least one work operation. The operator interface includes at least one control device. The operator interface also includes an indication system disposed adjacent to the at least one control device. The indication system includes a first symbol associated with a plurality of control patterns of the at least one control device. The remote control station also includes a controller operatively coupled with the operator interface. The controller is configured to store the plurality of control patterns therein. The controller is configured to receive an input signal from the operator interface for activation of one of the plurality of control patterns. The controller is also configured to transmit an output signal for performing the at least one work operation based on the activated control pattern In yet another aspect of the present disclosure, a method of operating a remote control station for remotely controlling at least one work operation is provided. The remote control station includes an operator interface. The method includes generating an input signal for activation of one of a plurality of control patterns associated with at least one control device of the operator interface. The operator interface includes an indication system disposed adjacent to the at least one control device. Further, the indication system includes a first symbol associated with the plurality of control patterns of the at least one control device. The method also includes receiving the input signal by a controller of the remote control station. The controller is operatively coupled with the operator interface and configured to store the plurality of control patterns therein. The method further includes transmitting, by the controller, an output signal for performing the at least one work operation based on the activated control pattern.

Other features and aspects of this disclosure will be apparent from the following description and the accompanying drawings.

DETAILED DESCRIPTION

Wherever possible, the same reference numbers will be used throughout the drawings to refer to the same or the like parts. Wherever possible, corresponding or similar reference numbers will be used throughout the drawings to refer to the same or corresponding parts.

Figure 1:
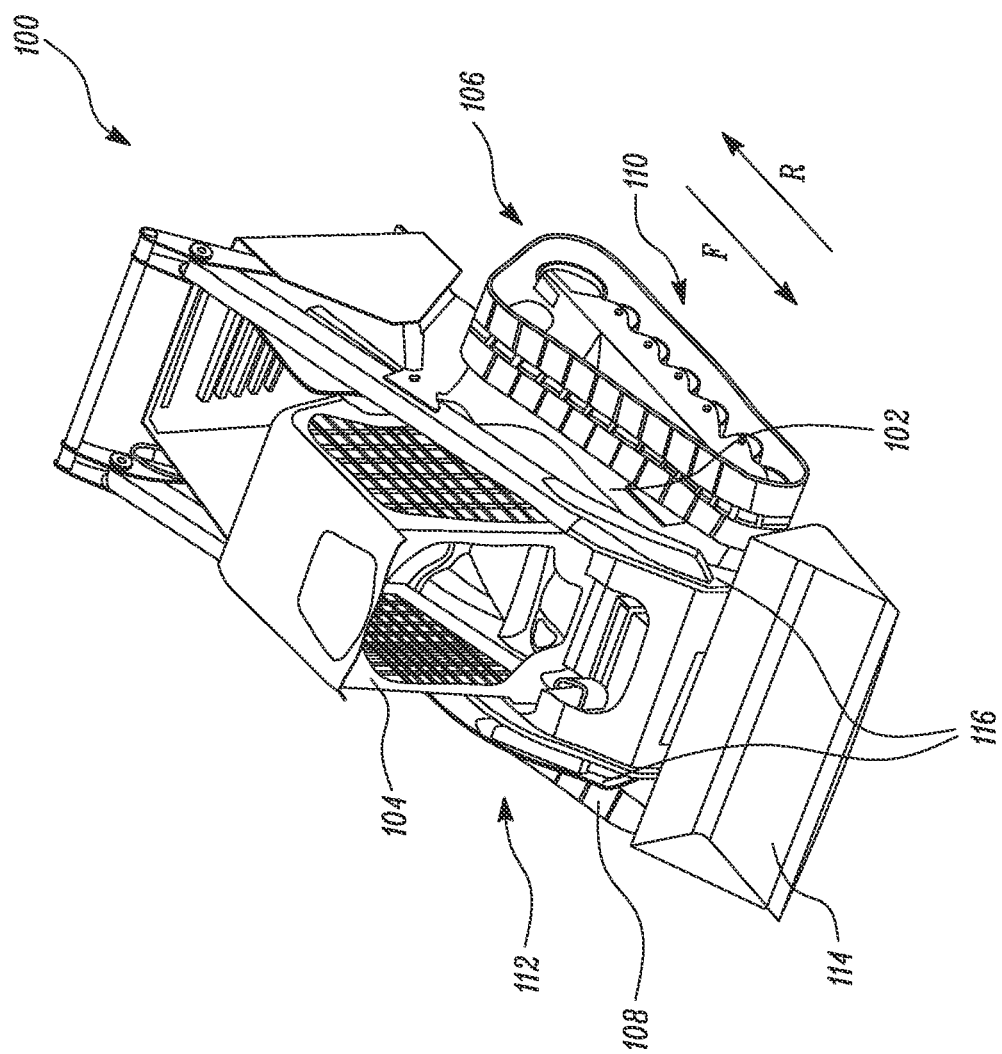
FIG. 1 is a perspective view of an exemplary machine.

Referring to FIG. 1, an exemplary machine 100 is illustrated. Specifically, the machine 100 is embodied as a skid steer loader. Although a skid steer loader is depicted, the present disclosure may be applied to other machines, such as backhoe loaders, excavators, and the like. In the illustrated example, the machine 100 may be used to load and move materials, such as, dirt, asphalt, gravel, rocks, sand, snow, debris, etc. or for digging, grading, and other such work operations.

The machine 100 includes a frame 102. The frame 102 supports various components of the machine 100, such as an engine (not shown) and an operator cabin 104. The engine generates output power and may include an internal combustion engine. The engine may include a gasoline engine, a diesel engine, a natural gas engine, and the like. The engine may supply the output power to various components of the machine 100 for operation thereof. Further, the machine 100 includes the operator cabin 104.

The machine 100 may move in a forward direction "F" or a reverse direction "R". The machine 100 includes one or more ground engaging members 106, 108 for movement of the machine 100 in the forward direction "F" or the reverse direction "R". The ground engaging members 106, 108 are embodied as tracks herein. Alternatively, the ground engaging members 106, 108 may include wheels. In the illustrated example, the machine 100 includes the first ground engaging member 106 disposed at a left side 110 of the machine 100 and the second ground engaging member 108 disposed at a right hand side 112 of the machine 100. The ground engaging members 106, 108 may move in the forward direction "F" or the reverse direction "R" for the movement of the machine 100. In some examples, the first and second ground engaging members 106, 108 may move together in the forward direction "F" or the reverse direction "R". Further, it may be contemplated that the first and second ground engaging members 106, 108 may be individually controlled for movement in the forward direction "F" or the reverse direction "R".

The machine 100 also includes a work implement 114. The work implement 114 is embodied as a bucket herein. It should be understood, however, that the work implement 114 may include any other type of work implement. The work implement 114 is connected to the frame 102 of the machine 100 by a pair of lift arms 116. The work implement 114 is pivotally coupled to the lift arms 116. Further, the work implement 114 may be mounted with only a single arm, boom, and stick. The work implement 114 may be lifted or tilted to perform one or more work operations. The work implement 114 may be lifted or lowered by a pair of hydraulic cylinders or pneumatic cylinders. Moreover, the work implement 114 may be tilted to a dump position or a rack position by one or more hydraulic cylinders or pneumatic cylinders, as per requirements.

Figure 2:
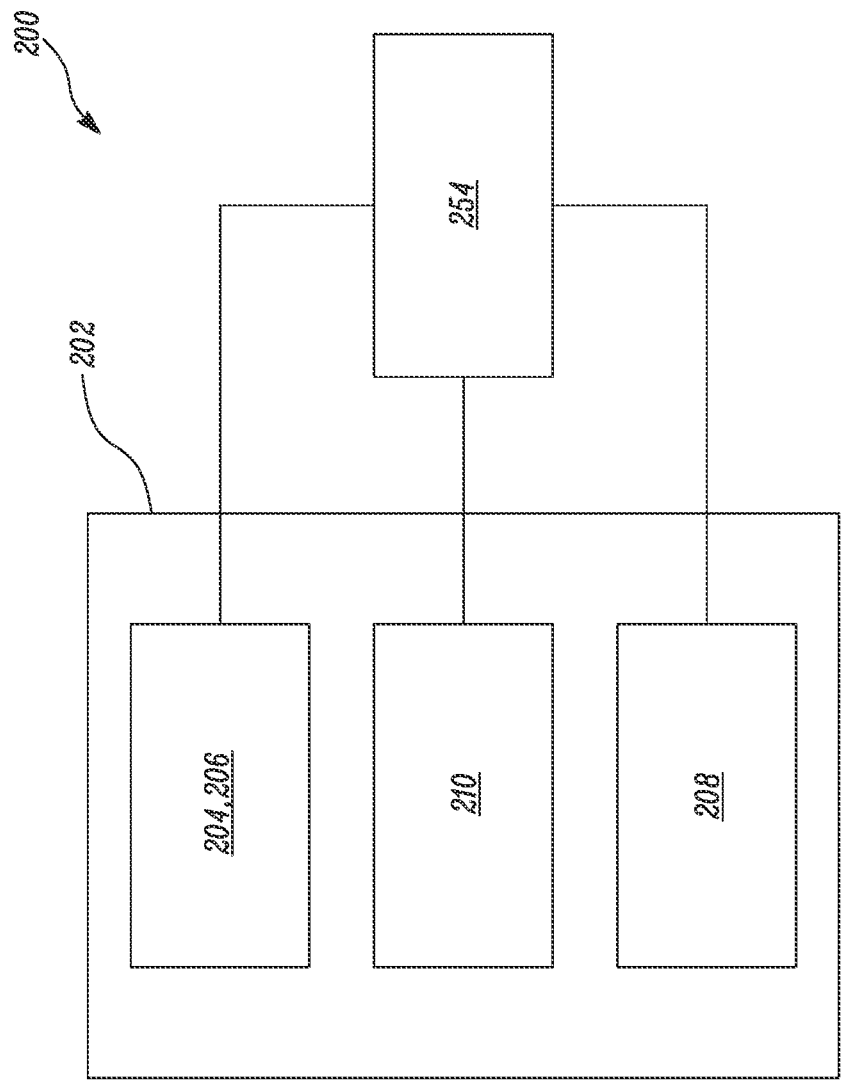
FIG. 2 illustrates a block diagram of a remote control station for remotely controlling the machine.

Further, the machine 100 is remotely controllable by an operator present at a base station (not shown). The base station may be located at a worksite where the machine 100 is operating or the base station may be remote to the worksite, without any limitations. Moreover, as shown in FIG. 2, a remote control station 200 is used to remotely control the machine 100 (see FIG. 1). It should be noted that the remote control station 200 may be used to control any type of mobile or stationary machine, without any limitations.

The remote control station 200 is in communication with the machine 100. The remote control station 200 includes an operator interface 202 for remotely controlling one or more work operations. The operator interface 202 may be hereinafter interchangeably referred to as the first operator interface 202. The first operator interface 202 illustrated herein is exemplary in nature and it should be understood that the first operator interface 202 may include any other design, as per application requirements. The operator interface 202 is embodied as a physical device. The operator interface 202 may include one or more physical input devices, one or more virtual input devices, or a combination of physical and virtual input devices. For example, in some cases, the operator interface 202 may include physical input devices, such as, a joystick, a switch, a knob, and a pedal, as well as a display screen having virtual input devices. The operator interface 202 may be embodied as a console with various input devices such as a pair of control devices 204, 206 and an input device 208, output devices such as a display device 210, and signages that assist the operator in remotely controlling the machine 100. For example, the operator may remotely move the machine 100 in the forward direction "F" (see FIG. 1) or the reverse direction "R" (see FIG. 1) or the operator may remotely move the work implement 114 (see FIG. 1) to perform various work operations, such as loading or unloading material.

Figure 3:
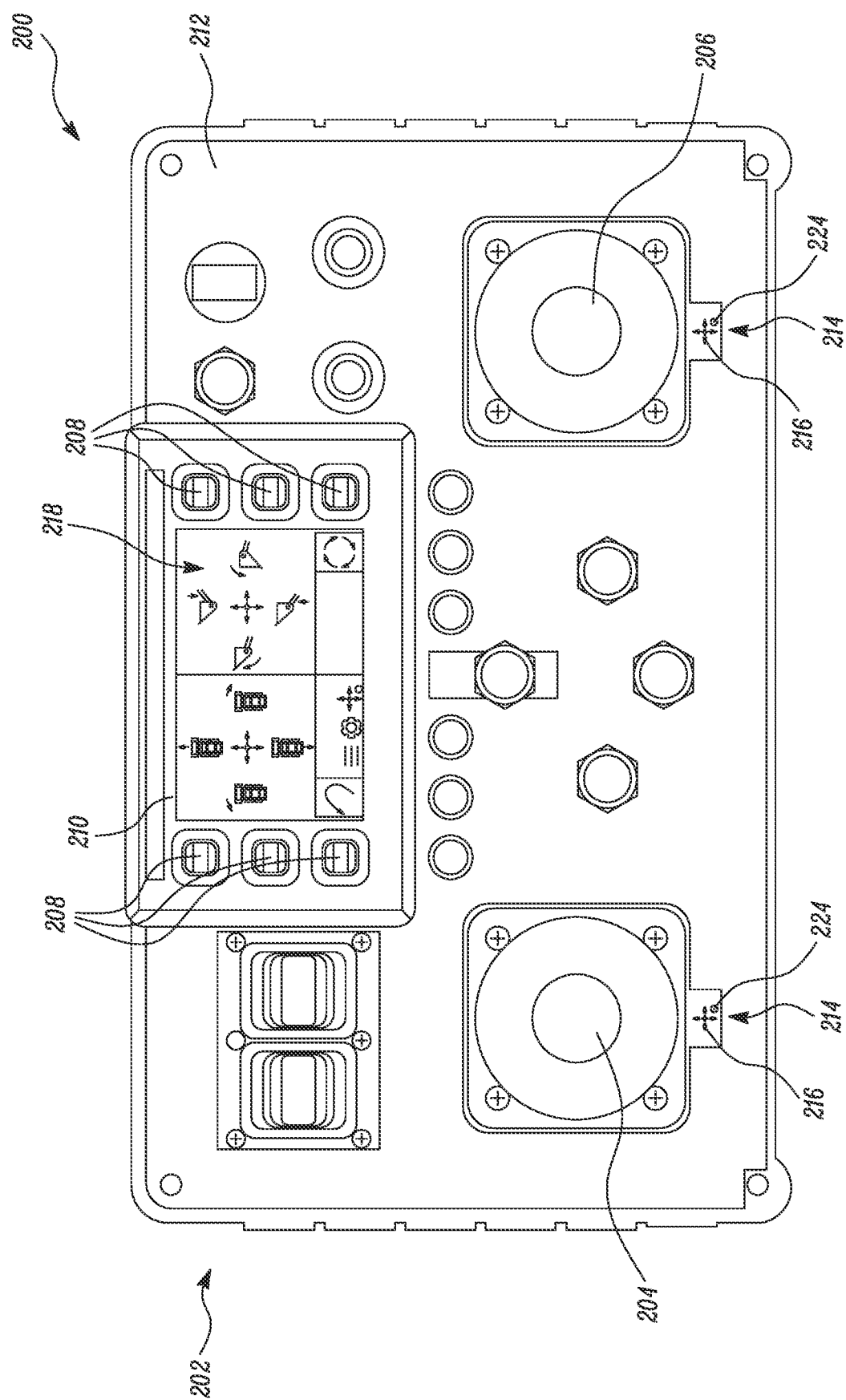
FIG. 3 illustrates a first operator interface, in accordance with the present disclosure.

As shown in FIG. 3, the operator interface 202 includes a face plate 212. The face plate 212 includes various signages, indicators, or markings that may assist the operator in controlling the machine 100 (see FIG. 1). Further, the face plate 212 may support various input and output devices of the operator interface 202. The operator interface 202 also includes the one or more control devices 204, 206. In the illustrated example, the operator interface 202 includes the first control device 204 and the second control device 206. Alternatively, the operator interface 202 may include a single control device or more than two control devices. The control device 204 may be hereinafter interchangeably referred to as the first control device 204 and the control device 206 may be hereinafter interchangeably referred to as the second control device 206.

The one or more control devices 204, 206 includes a physical control device or a virtual control device. In the illustrated example, the control device 204, 206 includes the physical control device. The one or more control devices 204, 206 may include a joystick, a switch, a knob, and a pedal. It should be noted that the present disclosure is not limited by a type of the control device 204, 206, and the operator interface 202 may include any other type of the control device. The control devices 204, 206 are embodied as joysticks herein. The control devices 204, 206 are illustrated in a neutral position in the accompanying figure. The control devices 204, 206 may be moved from the neutral position to perform one or more work operations. In some examples, the one or more work operations may include the movement of the machine 100 or the work implement 114 (see FIG. 1) of the machine 100. Each control device 204, 206 is movable horizontally and vertically to perform the one or more work operations.

Further, the operator interface 202 includes an indication system 214 disposed adjacent to the one or more control devices 204, 206. In the illustrated example, the indication system 214 is disposed on the face plate 212 of the operator interface 202 proximate the control devices 204, 206. The indication system 214 includes a first symbol 216 associated with a number of control patterns 218, 220 of the one or more control devices 204, 206. In the illustrated example, the first symbol 216 is indicative of the movement of the control devices 204, 206. The first symbol 216 includes two axes that are perpendicular to each other that depict the control pattern 218, 220 of the control devices 204, 206. The first symbol 216 provides an indication to the operator that the control devices 204, 206 can be moved forward/backward or side to side. It should be noted that the first symbol 216 illustrated herein is exemplary in nature and the first symbol 216 may vary based on a type of the control devices 204, 206 and a type of the operator interface 202. The indication system 214 also includes a generic marking 224 that is disposed adjacent to the first symbol 216. The generic marking 224 depicted as "O" herein is exemplary, and the generic marking 224 may vary as required.

Figure 4:
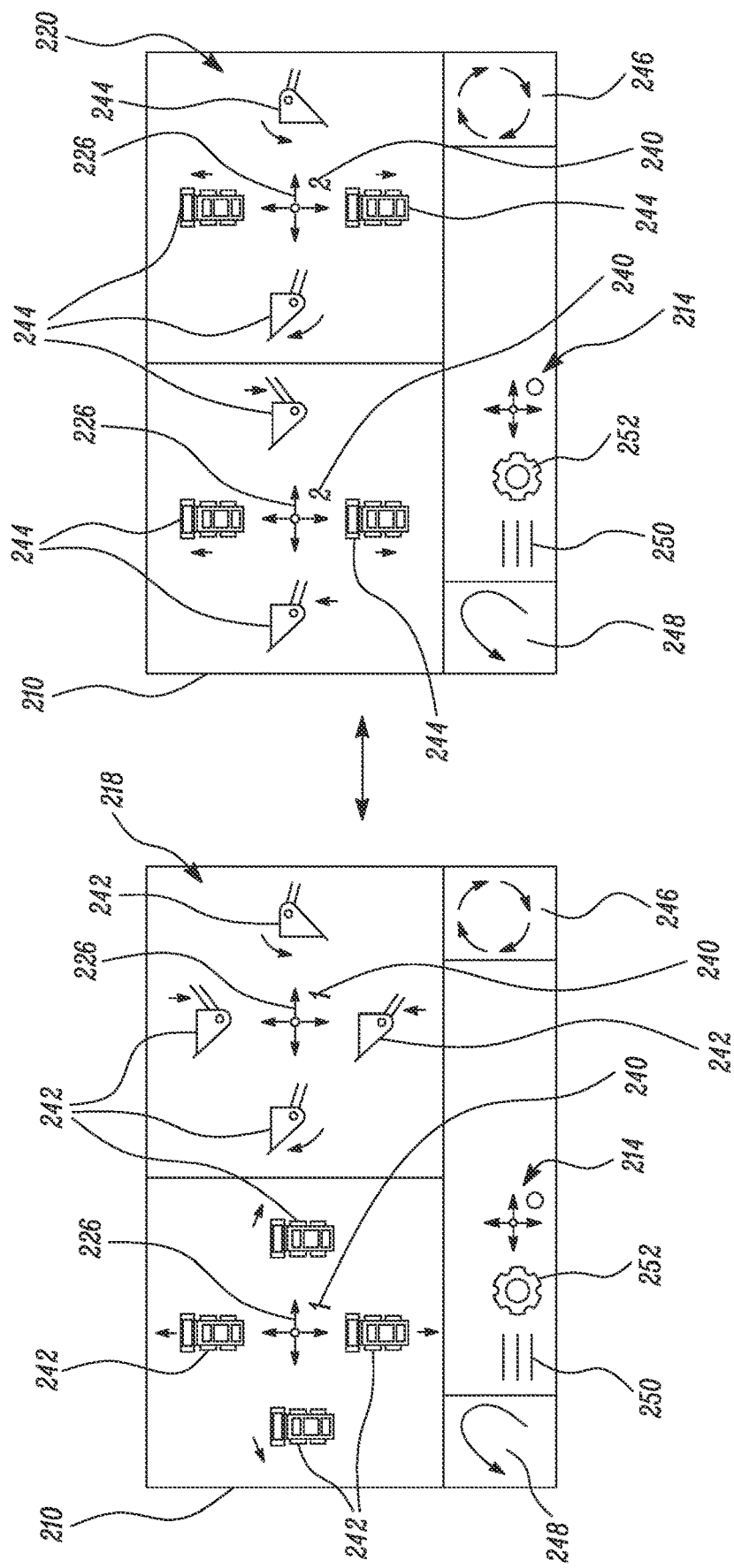
FIG. 4 illustrates different control patterns that may be displayed on the first operator interface of FIG. 3.

Further, the operator interface 202 includes the display device 210 to display the number of control patterns 218, 220 thereon. Specifically, the display device 210 displays the first control pattern 218 and the second control pattern 220. The control pattern 218 may be hereinafter interchangeably referred to as the first control pattern 218 and the control pattern 220 may be hereinafter interchangeably referred to as the second control pattern 220. In some examples, the display device 210 also includes the indication system 214 (as shown in FIG. 4). Specifically, the indication system 214 may be displayed on the display device 210. The indication system 214 may be displayed on a control pattern screen, a main control page, or a home page on the display device 210. Further, in some examples, the indication system 214 may be displayed on the display device 210 as well as the face plate 212 of the operator interface 202. In the illustrated example, the display device 210 includes a single display device.

Further, the term "control pattern" as used herein may be defined as a map that coordinates a position of the control device 204, 206 with a corresponding work operation being performed. The operator of the machine 100 may switch between the number of control patterns 218, 220 as required. The first and second control patterns 218, 220 are compliant with International Organization for Standardization (ISO).

As shown in FIG. 4, each of the number of control patterns 218, 220 being displayed includes a second symbol 226 that is substantially similar to the first symbol 216. More specifically, the second symbol 226 is indicative of the movement of the control devices 204, 206 (see FIG. 3). Further, a numeric marking 240 associated with the control pattern 218, 220 is disposed adjacent to the second symbol 226. The second symbol 226 provides an indication to the operator that the control devices 204, 206 can be moved forward/backward or side to side. It should be noted that the second symbol 226 illustrated herein is exemplary in nature and the second symbol 226 may vary based on variation in the first symbol 216.

Further, the numeric marking 240 varies based on the control pattern 218, 220. For example, the second symbol 226 associated with the first control pattern 218 includes "1" as the numeric marking 240 and the second symbol 226 associated with the second control pattern 220 includes "2" as the numeric marking 240. The numeric marking 240 is indicative of a serial number of the control pattern 218, 220. Moreover, each control pattern 218, 220 displayed on the display device 210 includes a number of control pattern symbols 242, 244. It should be noted that the control pattern symbols 242, 244 are different for the first and second control patterns 218, 220. Specifically, the first control pattern 218 includes the first control pattern symbols 242 and the second control pattern 220 includes the second control pattern symbols 244. The first and second control pattern symbols 242, 244 are indicative of the work operation that will be performed based on the movement of the first and second control devices 204, 206 towards a particular position. In the illustrated example, the first and second control pattern symbols 242, 244 include diagrammatic representations of the machine 100 (see FIG. 1) and the work implement 114 (see FIG. 1). Alternatively, the first and second control pattern symbols 242, 244 may include text instead of the diagrammatic representations.

Various positions to which the first and second control devices 204, 206 can be moved will now be explained in detail. When the first control pattern 218 is active and displayed on the display device 210, the first control device 204 controls the movement of the machine 100, while the second control device 206 controls the movement of the work implement 114. More specifically, pushing the first control device 204 away from the operator past the neutral position to a forward position drives the machine 100 in the forward direction "F" straight ahead. Pulling the first control device 204 back toward the operator past the neutral position to a backward position drives the machine 100 in the reverse direction "R". Further, pushing the first control device 204 to a left position steers the machine 100 left, and pushing the first control device 204 to a right position steers the machine 100 right.

Furthermore, in the first control pattern 218, pushing the second control device 206 away from the operator past the neutral position to a forward position lowers the lift arms 116 (see FIG. 1), thereby lowering the work implement 114. Pulling the second control device 206 back toward the operator past the neutral position to a backward position raises the lift arms 116, thereby raising the work implement 114. Further, pushing the second control device 206 away from the operator past the neutral position to a right position pushes the work implement 114 to the dump position. Whereas, pulling the second control device 206 to a left position brings the work implement 114 to the rack position. In the illustrated example, the first control pattern 218 for the first control device 204 and the first control pattern 218 for the second control device 206 are displayed side by side on the display device 210.

Further, when the second control pattern 220 is active and displayed on the display device 210, pushing the first control device 204 away from the operator past the neutral position to the forward position drives the first ground engaging member 106 in the forward direction "F" straight ahead. Pulling the first control device 204 back toward the operator past the neutral position to the backward position drives the first ground engaging member 106 in the reverse direction "R". Further, pushing the first control device 204 to the left position raises the lift arms 116, thereby raising the work implement 114, and pushing the first control device 204 to the right position lowers the lift arms 116, thereby lowering the work implement 114.

Furthermore, in the second control pattern 220, pushing the second control device 206 away from the operator past the neutral position to the forward position drives the second ground engaging member 108 in the forward direction "F" straight ahead. Pulling the second control device 206 back toward the operator past the neutral position to the backward position drives the second ground engaging member 108 in the reverse direction "R". Further, pushing the second control device 206 away from the operator past the neutral position to the right position pushes the work implement 114 to the dump position. Whereas, pulling the second control device 206 to the left position brings the work implement 114 to the rack position. In the illustrated example, the second control pattern 220 for the first control device 204 and the second control pattern 220 for the second control device 206 are displayed side by side on the display device 210.

Further, the operator interface 202 includes one or more input devices 208. The operator of the machine 100 may use one of the input devices 208 to switch between the different control patterns 218, 220 or for activation/deactivation of a specific control pattern 218, 220. The input device 208 allows the operator to browse the different control patterns 218, 220 and select a desired control pattern 218, 220, as per application requirements. A cycle icon 246 on the display device 210 may be used to switch between the different control pattern 218, 220. Further, a back icon 248 is also displayed on the display device 210 that assists the operator to return to a previous page. Moreover, the display device 210 as illustrated herein also includes a breadcrumb 250. Further, if there are more than two control patterns 218, 220, the operator may browse through the control patterns 218, 220 until the desired control pattern 218, 220 is displayed on the display device 210. In some examples, one of the control pattern 218, 220 may be directly displayed on the display device 210 as soon as the machine 100 connects with the remote control station 200. Alternatively, the control patterns 218, 220 may be accessed directly from the home screen or from a settings menu 252.

In an example, the input device 208 may embody a switch, a button, a knob, a lever, and the like. In the illustrated example, the operator interface 202 includes six input devices 208 that are embodied as buttons. Any of the six input devices 208 may be programmed such that the corresponding input device 208 is used for the selection of the control pattern 218, 220. In some examples, the display device 210 may be embodied as a touch screen such that the operator may switch between the different control patterns 218, 220 or activate/deactivate the desired control pattern 218, 220 by providing inputs directly to the display device 210.

The remote control station 200 also includes a controller 254 (shown in FIG. 2) operatively coupled with the operator interface 202. In an example, the controller 254 may be present at the base station. In another example, the controller 254 may be present on the machine 100. In an example, the controller 254 may be in communication with various components of the machine 100. In such an example, the controller 254 may transmit control signals directly to the components of the machine 100. Alternatively, the controller 254 may be in communication with an Electronic Control Unit (ECU) present onboard the machine 100. In such an example, the controller 254 may transmit control signals to the ECU and the ECU may in turn control the components of the machine 100. In some examples, the ECU onboard the machine 100 may be programmed to perform the functions of the controller 254.

The controller 254 may be embodied as a single microprocessor or multiple microprocessors for receiving signals from various components of the machine 100. Numerous commercially available microprocessors may be configured to perform the functions of the controller 254. It should be appreciated that the controller 254 may embody a machine microprocessor capable of controlling numerous machine functions. A person of ordinary skill in the art will appreciate that the controller 254 may additionally include other components and may also perform other functions not described herein.

The controller 254 stores the number of control patterns 218, 220 therein. In an example, the operator may have to select a specific control pattern 218, 220 upon starting the machine 100. In another example, as soon as the controller 254 wirelessly connects with the machine 100, a specific control pattern 218, 220 may be displayed on the display device 210. Such a control pattern 218, 220 may embody a pre-set or default control pattern that may be stored in the controller 254. When the controller 254 includes the pre-set or default control pattern, the work operations may be performed based on the pre-set or default control pattern until the operator selects another control pattern 218, 220.

Further, the controller 254 receives an input signal from the operator interface 202 for activation of one of the number of control patterns 218, 220. More particularly, the operator interface 202 includes the input device 208 that is communicably coupled with the controller 254 for receipt of the input signal. In an example, one of the six input devices 208 is operably connected to the controller 254 and is capable of sending the input signal to the controller 254 that is indicative of the selected control pattern 218, 220. Further, the controller 254 transmits an output signal for performing the one or more work operations based on the activated control pattern 218, 220. The output signal may be provided directly to the components of the machine 100 or the output signal may be transmitted to the ECU. In an example, wherein the work operations are being directly controlled by the controller 254, the controller 254 may send the output signals to control the ground engaging members 106, 108 (see FIG. 1) and the work implement 114 according to the control pattern 218, 220 selected by the operator.

Moreover, at any time during operation of the machine 100 the operator may switch between the different control patterns 218, 220. For example, during initial machine operation, the operator may use the first control pattern 218 for performing the work operations. In such examples, the work operations are performed based on the first control pattern 218. Subsequently, the operator or another operator may use the input device 208 to switch to the second control pattern 220. Further, the controller 254 may switch between the number of control patterns 218, 220 based on receipt of the input signal. In some examples, the controller 254 may transmit an output signal to the machine 100 for performing the work operations as per the second control pattern 220.

It should be noted that the controller 254 may activate one of the control patterns 218, 220 from the number of control patterns 218, 220 or switch between the number of control patterns 218, 220 based on a type of the machine 100, a type of the work implement 114, and a state of the machine 100. For example, the controller 254 may detect the type of the machine 100 and accordingly activate a default control pattern based on the type of the machine 100. Further, the activated control pattern 218, 220 is displayed on the display device 210. In an example, wherein the machine 100 is a skid steer loader, the controller 254 may display a default control pattern applicable to the skid steer loader on the display device 210.

Further, the controller 254 may detect the type of the work implement 114 and accordingly activate a default control pattern based on the type of the work implement 114. Moreover, the activated control pattern 218, 220 is displayed on the display device 210. In an example, wherein the work implement 114 is a bucket, the controller 254 may display a default control pattern applicable to the bucket on the display device 210. Further, the controller 254 may allow activation of one of the control patterns 218, 220 or switching between the control patterns 218, 220 only when the machine 100 is in a stationary condition or brakes of the machine 100 are activated. In some examples, the controller 254 may also check a state of the first and second control devices 204, 206 to allow activation of one of the control patterns 218, 220 or switching between the control patterns 218, 220. More particularly, the controller 254 may determine if the first and second control devices 204, 206 are in the neutral position. Only if the first and second control devices 204, 206 are in the neutral position, the controller 254 may allow activation of one of the control patterns 218, 220 or allow switching between the control patterns 218, 220.

Figure 5:
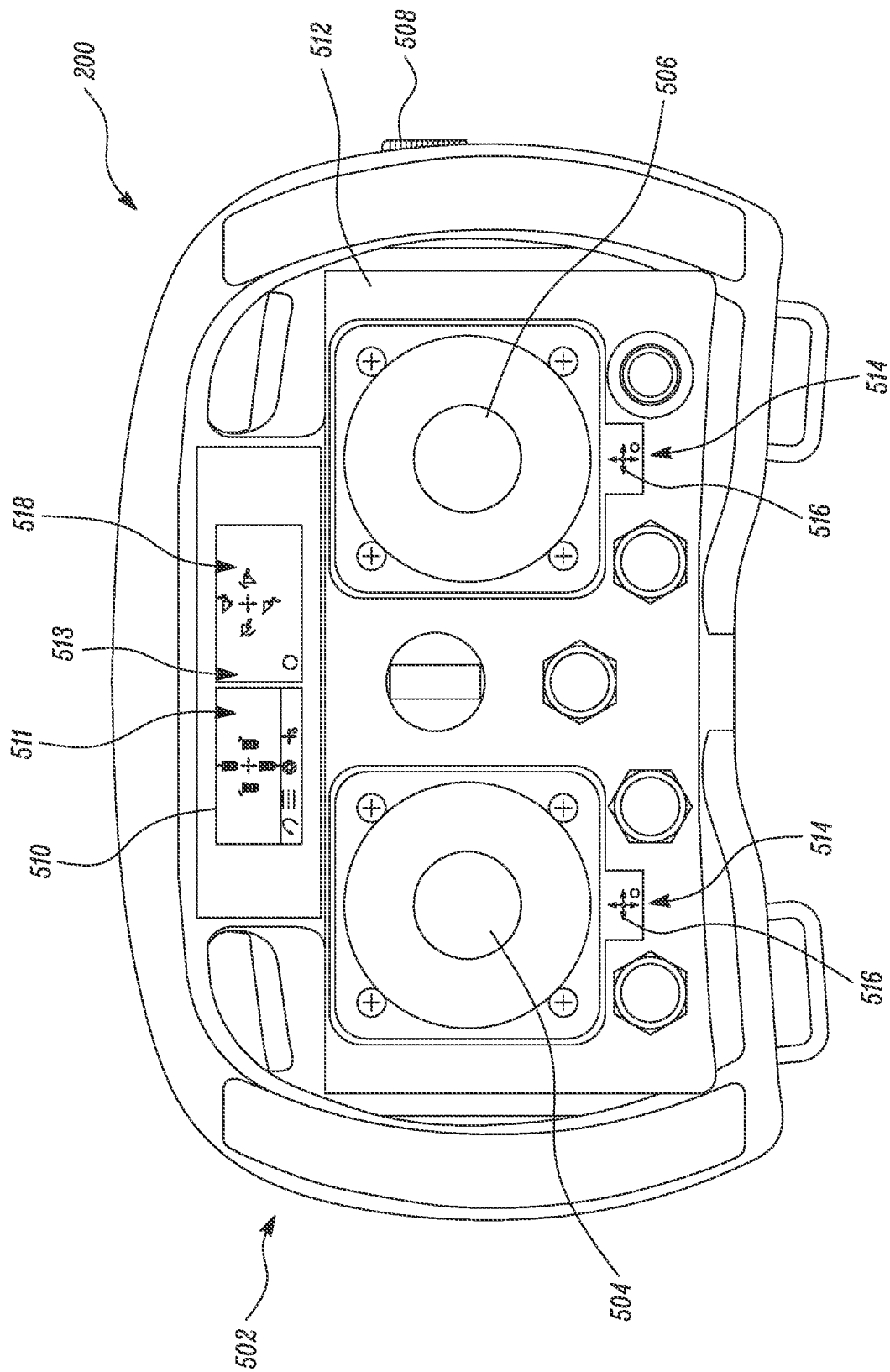
FIG. 5 illustrates a second operator interface, in accordance with the present disclosure.

FIG. 5 illustrates another design of an operator interface 502, hereinafter interchangeably referred to as the second operator interface 502, associated with the remote control station 200. Functionalities of the second operator interface 502 are similar to the functionalities of the first operator interface 202 described in relation to FIGS. 2 to 4. The second operator interface 502 includes a first control device 504, a second control device 506, and an indication system 514 similar to the first control device 204, the second control device 206, and the indication system 214 explained in relation to FIGS. 2 to 4. The indication system 514 includes a first symbol 516 similar to the first symbol 216 explained in relation to FIG. 3. Further, the operator interface 502 includes a display device 510. In the illustrated example, the display device 510 includes a first display screen 511 and a second display screen 513.

Figure 6:
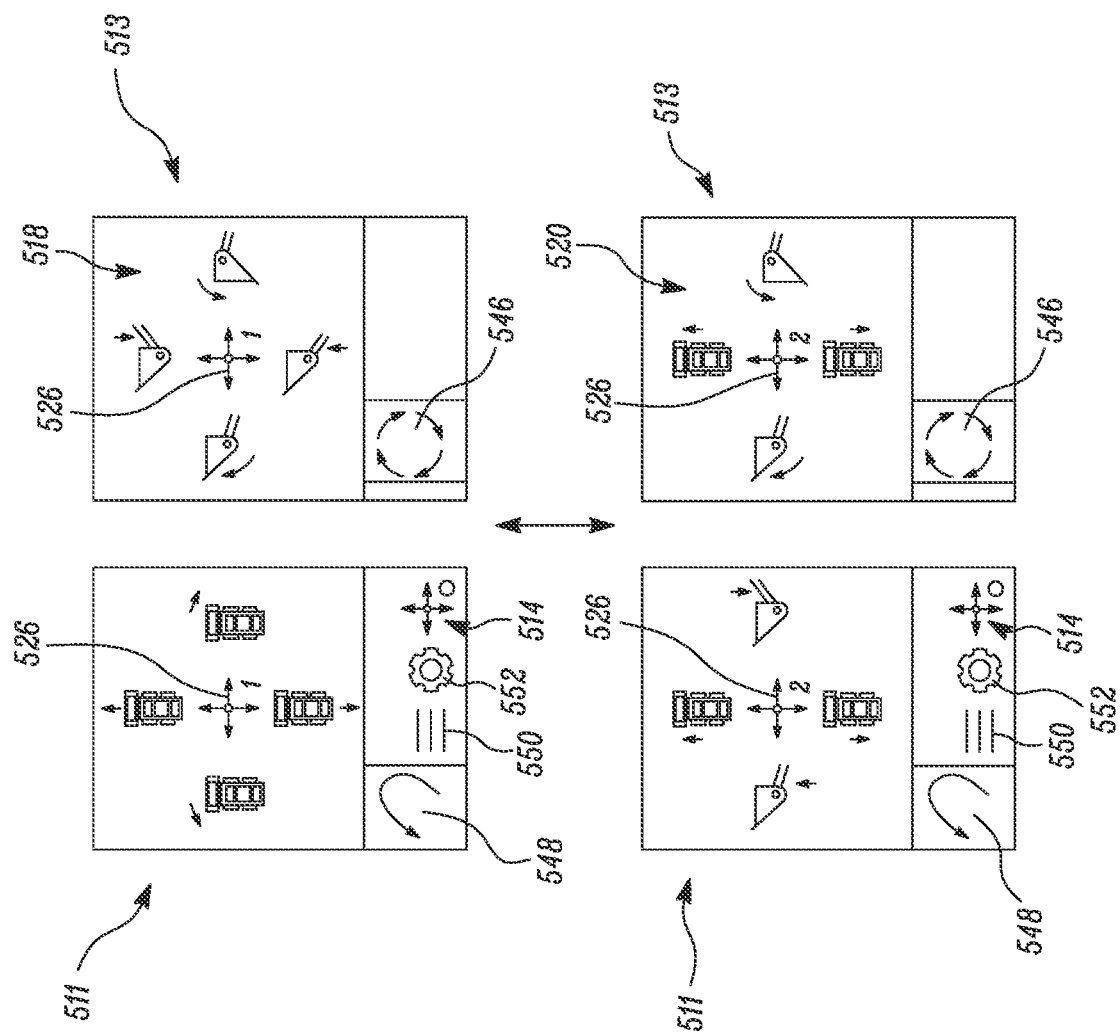
FIG. 6 illustrates different control patterns that may be displayed on the second operator interface of FIG. 5.

As shown in FIG. 6, in this example, a first control pattern 518 for the first and second control device 504, 506 are displayed on the first and second display screen 511, 513, respectively. Further, a second control pattern 520 for the first and second control device 504, 506 are displayed on the first and second display screen 511, 513, respectively. The first and second control patterns 518, 520 are similar to the first and second control patterns 218, 220 explained in relation to FIG. 4. Further, the first and second control patterns 518, 520 include a second symbol 526 similar to the second symbol 226 explained in relation to FIG. 4.

As illustrated, a back icon 548, a breadcrumb 550, a settings menu 552, and the second symbol 526 are displayed on the first display screen 511 and a cycle icon 546 is displayed on the second display screen 513. Further, the operator may be able to switch between the different control patterns 518, 520 or activate/deactivate a specific control pattern 518, 520 using the second operator interface 502. For this purpose, the operator includes an input device 508. In the illustrated example, the input device 508 is a knob that can be used to browse through the different control patterns 518, 520.

Figure 7:
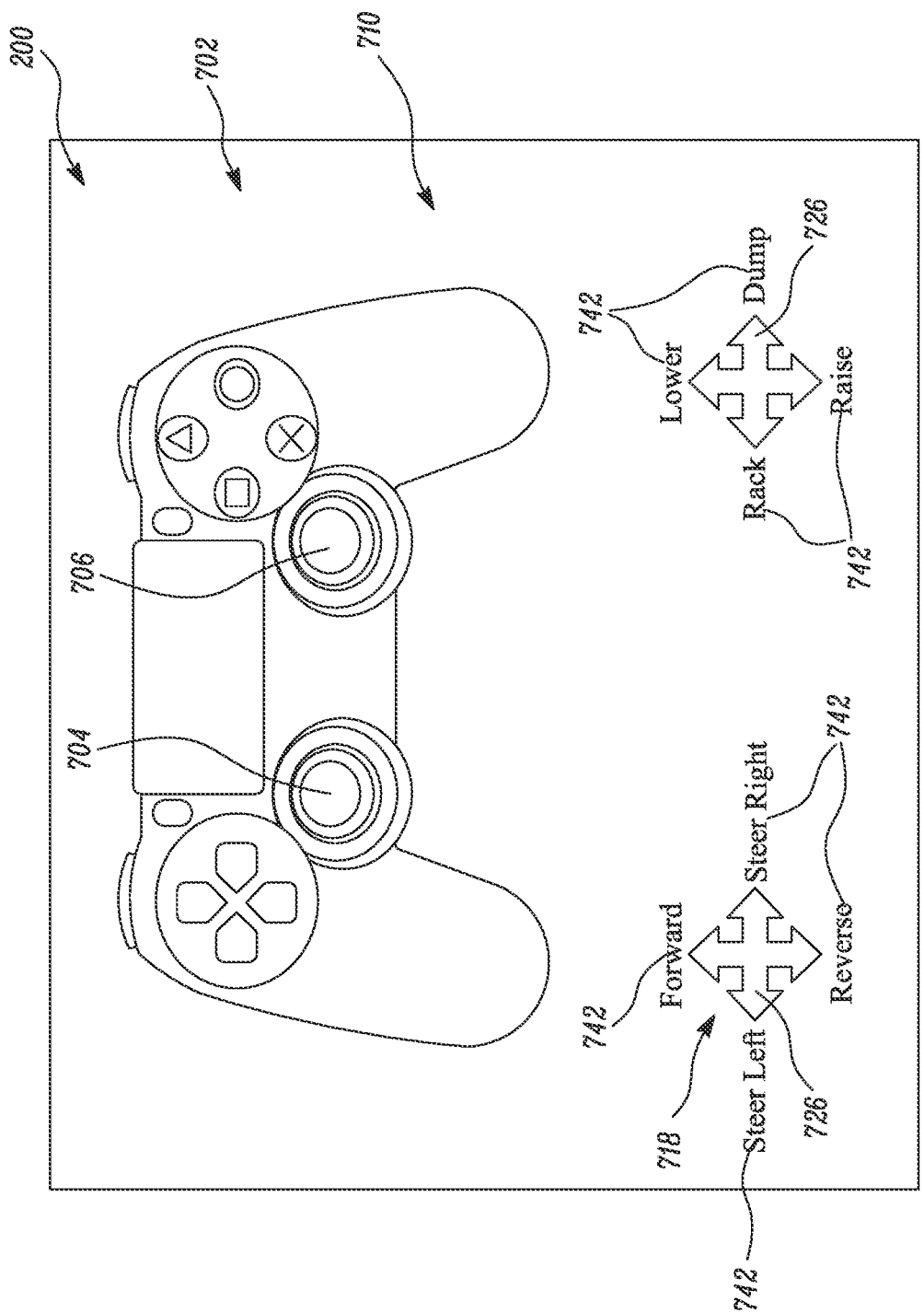
FIG. 7 illustrates a third operator interface, in accordance with the present disclosure.

FIG. 7 illustrates another design of an operator interface 702, hereinafter interchangeably referred to as the third operator interface 702, associated with the remote control station 200. Functionalities of the third operator interface 702 is similar to the functionalities of the first operator interface 202 explained in relation to FIG. 2 to 4. The third operator interface 702 is embodied as a portable or handheld computing device. In an example, the third operator interface 702 may include a computer, a mobile, a tablet, and the like.

The third operator interface 702 includes a first control device 704 and a second control device 706. Functions of the first control device 704 and the second control device 706 are similar to the function of the first control device 204 and the second control device 206 explained in relation to FIGS. 2 to 4. However, in the illustrated example, the first and second control devices 704, 706 are embodied as virtual control devices. More particularly, the operator interface 702 is embodied as a physical device which in turn includes virtual control devices or virtual input devices. Each of the first and second control devices 704, 706 are displayed on a display device 710 of the third operator interface 702 such that tapping or pressing on the first and second control devices 704, 706 translates to the work operation on the machine 100 (see FIG. 1).

Further, the display device 710 displays a first control pattern 718 and a second control pattern (not shown) thereon. The first control pattern 718 and the second control pattern are similar to the first and second control patterns 218, 220 explained in relation to FIG. 4. As illustrated, the display device 710 displays the first control pattern 718 and the second control pattern proximate to the corresponding first and second control devices 704, 706. The first control pattern 718 includes a second symbol 726 similar to the second symbol 226 explained in relation to FIG. 4 and also a number of control pattern symbols 742. The second control pattern may also include a second symbol (not shown) similar to the second symbol 226 explained in relation to FIG. 4 and also a number of control pattern symbols (not shown).

In the illustrated example, the control pattern symbols 742 are embodied as texts instead of diagrammatic representations. For example, the accompanying figure illustrates that the first control pattern 718 is active. Accordingly, for the first control device 704, a text "forward" represents movement of the machine 100 in the forward direction "F", a text "reverse" represents movement of the machine 100 in the reverse direction "R", a text "steer left" indicates steering of the machine 100 to the left, and a text "steer right" indicates steering of the machine 100 to the right. Further, for the second control device 706, a text "lower" represents lowering of the work implement 114 (see FIG. 1), a text "raise" represents raising of the work implement 114, a text "rack" indicates the movement of the work implement 114 to the rack position, and a text "dump" indicates the movement of the work implement 114 to the dump position. Similarly, when the second control pattern 720 is active, the second control pattern symbols that are embodied as texts may be depicted proximate to the first and second control devices 704, 706.

Further, the operator may be able to switch between the different control patterns 718, 720 or activate/deactivate a desired control pattern 718, 720 using the third operator interface 702. For this purpose, the display device 710 may include a dedicated input device (not shown) that allows switching between the different control patterns 718, 720. The input device is embodied as a virtual device. In the illustrated example, the input device may be provided on the display device 710 itself in the form of an icon. The operator may switch between the different control patterns 718, 720 or activate/deactivate a desired control pattern 718, 720 by providing inputs directly to the input device on the display device 710.

In some examples, the operator interface 702 may include physical control devices, such as the first and second control devices 204, 206 (shown and explained in FIGS. 2 and 3), as well as the display device 710. In such examples, the operator interface 702 may have physical joysticks and the display device 710 may display the control pattern 718, 720 as well as include virtual control devices such as virtual buttons, virtual switches, virtual joysticks, etc., based on application requirements.

INDUSTRIAL APPLICABILITY

Figure 8:
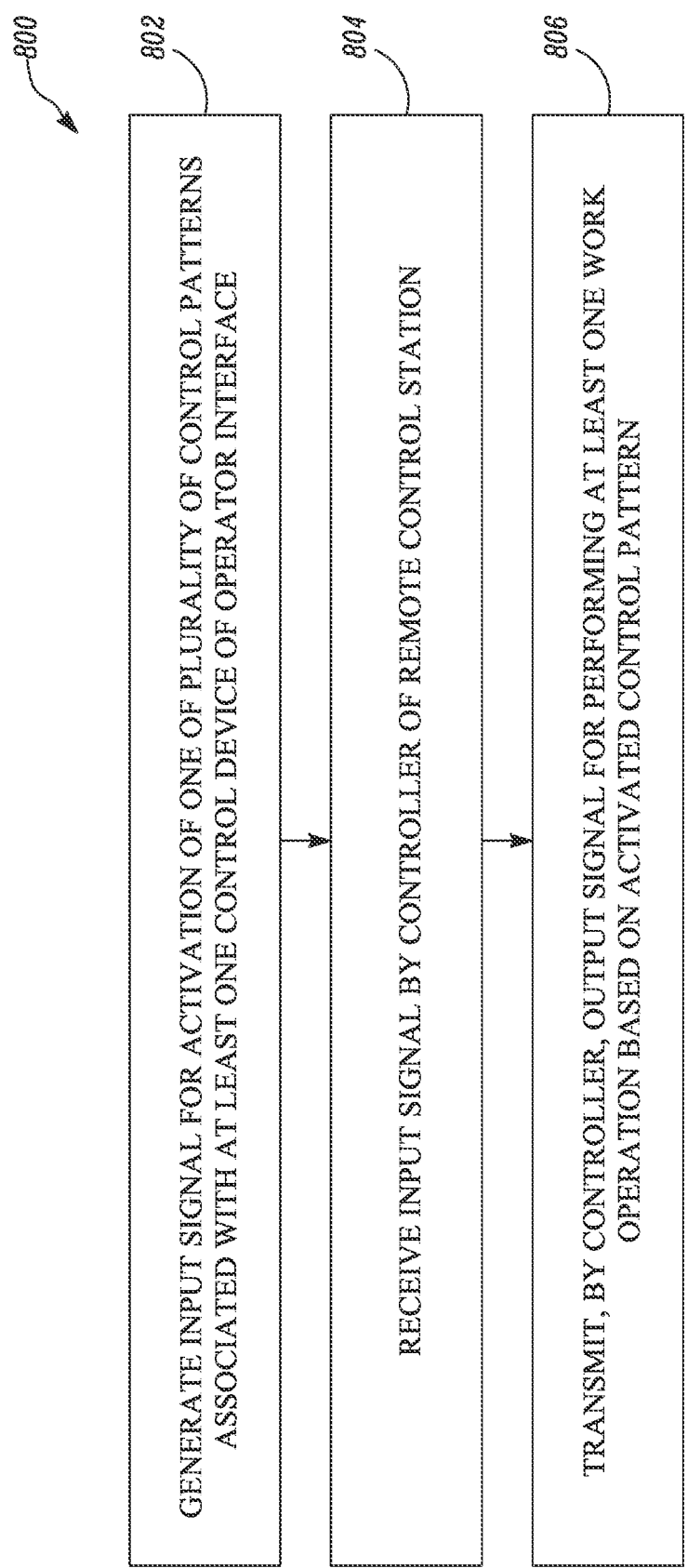
FIG. 8 illustrates a flowchart for a method of operating the remote control station for remotely controlling one or more work operations.

This section will now be explained in relation to the operator interface 202 explained in relation to FIGS. 2 to 4. However, it should be noted that the details mentioned below are equally applicable to the operator interface 502, 702 explained in relation to FIGS. 5, 6, and 7. FIG. 8 illustrates a flowchart for a method 800 of operating the remote control station 200 for remotely controlling the one or more work operations. The remote control station 200 includes the operator interface 202. At step 802, the input signal for the activation of one of the number of control patterns 218, 220 of the one or more control devices 204, 206 of the operator interface 202 is generated. The operator interface 202 includes the indication system 214 disposed adjacent to the one or more control devices 204, 206. Further, the indication system 214 includes the first symbol 216 associated with the number of control patterns 218, 220 of the one or more control devices 204, 206. Moreover, the number of control patterns 218, 220 are displayed on the display device 210. Each of the number of control patterns 218, 220 being displayed includes the second symbol 226 that is substantially similar to the first symbol 216.

At step 804, the input signal is received by the controller 254 of the remote control station. The controller 254 is operatively coupled with the operator interface 202 and stores the number of control patterns 218, 220 therein. In an example, the controller 254 switches between the number of control patterns 218, 220 based on receipt of the input signal. Further, the controller 254 activates one of the control patterns 218, 220 from the number of control patterns 218, 220 and switches between the number of control patterns 218, 220 based on the type of the machine 100, the type of the work implement 114, and the state of the machine 100. At step 806, the controller 254 transmits the output signal for performing the one or more work operations based on the activated control pattern 218, 220. In some examples, the output signal is transmitted for the movement of the machine 100 or the work implement 114 of the machine 100.

The present disclosure relates to the remote control station 200 for remotely controlling the work operations associated with the machine 100. Further, the face plate 212 of the operator interface 202 includes only the indication system 214 having the first symbol 216 and the display device 210 of the operator interface 202 displays the control patterns 218, 220 in a detailed and clear manner. Thus, the operator interface 202 described in the present disclosure reduces part numbers as the control patterns 218, 220 are displayed on the display device 210 instead of the face plate 212, and the face plate 212 may not have to be swapped for different control patterns 218, 220.

Further, the remote control station 200 allows the operator to switch between the different control patterns 218, 220 using the input device 208 and the display device 210. Accordingly, the operator may switch between the different control patterns 218, 220 in order to operate the machine 100 according to a familiar or preferred control pattern. Further, the present disclosure allows quick change between the different control patterns 218, 220 thereby saving time and efforts of the operator. The present disclosure provides a digitally configurable remote control station 200 that may be used with various types of machines. Further, the teachings of the present disclosure can be applied to physical operator interfaces as well as virtual operator interfaces, such as tablets, mobile phones, and the like.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

The invention claimed is:

1. A remote control station comprising:
  an operator interface to remotely control a plurality of work operations of a work machine, the operator interface including:
    a plurality of control devices, including a first control device and a second control device, each configured to be manually operated by an operator at the operator interface;
    an indicator adjacent to the first and second control devices, wherein the indicator is configured to indicate a plurality of symbols respectively associated with a plurality of control patterns to control the plurality of work operations of the work machine using the first and second control devices; and
    a display configured to display a first control pattern and a second control pattern of the plurality of control patterns thereon in respective one-to-one correspondence with the first and second control devices; and
  a controller operatively coupled with the operator interface, the controller being configured to access the plurality of control patterns, wherein the controller is configured to:
    receive an input signal from the operator interface regarding selection of the first control pattern and the second control pattern in respective one-to-one correspondence with the first and second control devices; and
    transmit output signaling to perform the plurality of work operations of the work machine based on the selected first and second control patterns responsive to the manual operation of the first and second control devices by the operator,
  wherein the first and second control patterns on the display in respective one-to-one correspondence with the first and second control devices are part of a larger group of candidate control patterns for selection by the operator using the operator interface,
  wherein each of the first and second control devices is configurable with different ones of the control patterns of the larger group of candidate control patterns for corresponding control of the work machine to perform the plurality of work operations,
  wherein the control pattern for each of the first and second control devices is changeable responsive to the input signal from the operator interface regarding the selection of the control pattern, and of the larger group of candidate control patterns, only the first and second control patterns in respective one-to-one correspondence with the first and second control devices are displayed on the display.

2. The remote control station of claim 1, wherein each of the plurality of control devices includes at least one of a joystick, a switch, a knob, and a pedal.

3. The remote control station of claim 1, wherein the operator interface includes an input device that is communicably coupled with the controller for receipt of the input signal.

4. The remote control station of claim 1, wherein the controller is further configured to switch between the plurality of control patterns based on receipt of the input signal.

5. The remote control station of claim 1, wherein the plurality of control devices includes at least one of a physical control device and a virtual control device.

6. The remote control station of claim 1, wherein the display includes the indicator.

7. The remote control station of claim 1, wherein the plurality of work operations include movement of the work machine and movement of work implement of the work machine.

8. A remote control station comprising:
an operator interface to remotely control a plurality of work operations of a work machine, the operator interface including:
a plurality of control devices each manually operable by an operator using the operator interface; and
an indicator adjacent to the plurality of control devices, wherein the indicator is configured to indicate a plurality of symbols respectively associated with a plurality of control patterns to control the plurality of work operations of the work machine using the plurality of control devices; and
a controller operatively coupled with the operator interface, the controller being configured to access the plurality of control patterns, wherein the controller is configured to:
receive input signaling from the operator interface to activate a selected set of the plurality of control patterns in respective one-to-one correspondence with the plurality of control devices, a total number of the selected set of control patterns matching a total number of the plurality of control devices; and
transmit output signaling to perform the plurality of work operations of the work machine based on the activated control patterns responsive to the manual operation of the plurality of control devices by the operator,
wherein the selected set of control patterns in respective one-to-one correspondence with the plurality of control devices is part of a larger group of candidate control patterns for selection by the operator using the operator interface,
wherein each of the plurality of control devices is configurable with different ones of the control patterns of the larger group of candidate control patterns for corresponding control of the work machine, and
wherein the control pattern for each of the plurality of control devices is changeable responsive to the input signaling from the operator interface regarding the activation of the control pattern, and
of the larger group of candidate control patterns, only the selected set control patterns in respective one-to-one correspondence with the plurality of control devices are to be displayed on a display of the remote control station.

9. The remote control station of claim 8,
wherein the operator interface further includes the display communicably coupled with the controller, the display being configured to display the selected set of control patterns thereon, and
wherein each of the control patterns of selected set of control patterns being displayed includes a second symbol that has at least a portion the same as a first symbol.

10. The remote control station of claim 9, wherein the display includes the indicator.

11. The remote control station of claim 9, wherein the operator interface includes an input device that is communicably coupled with the controller for receipt of the input signaling.

12. The remote control station of claim 8, wherein the controller is further configured to switch between the plurality of control patterns based on receipt of the input signaling.

13. The remote control station of claim 8, wherein each of the plurality of control devices includes at least one of a joystick, a switch, a knob, and a pedal.

14. The remote control station of claim 8, wherein the plurality of control devices includes at least one of a physical control device and a virtual control device.

15. The remote control station of claim 8, wherein the plurality of work operations includes movement of the work machine and movement of a work implement of the work machine.

16. A method of operating a remote control station for remotely controlling a plurality of work operations performed by a work machine, the remote control station includes an operator interface, the method comprising:
activating a selected set of control patterns from among a plurality of control patterns in respective one-to-one correspondence with a plurality of control devices of the operator interface manually operable by an operator using the operator interface, wherein the operator interface includes an indicator adjacent to the plurality of control devices, and wherein the indicator is configured to indicate a plurality of symbols respectively associated with the selected set of control patterns to control the work operations of the work machine using the plurality of control devices;
receiving input signaling, using a controller of the remote control station, to control the work machine according to the plurality of work operations, the controller being operatively coupled with the operator interface and configured to access the selected set of control patterns; and
transmitting, using the controller, output signaling to perform the plurality of work operations based on the activated selected set of control patterns and responsive to operation of the plurality of control devices by the operator,
wherein each of the plurality of control devices is configurable with different ones of the control patterns of the plurality of control patterns for corresponding control of the work machine, and
wherein the control pattern for each of the plurality of control devices is changeable responsive to the input signaling from the operator interface regarding the activation of the control pattern, and of the plurality of control patterns, only the selected set of control patterns in respective one-to-one correspondence with the plurality of control devices are to be displayed on a display of the remote control station.

17. The method of claim 16 further comprising displaying on the display only the selected set of control patterns in respective one-to-one correspondence with the plurality of control devices,
   wherein each of the control patterns of the selected set of control patterns being displayed on the display includes a second symbol that is substantially similar to a first symbol.

18. The method of claim 16 further comprising switching, using the controller, one or more of the control patterns from the selected set of control patterns from among corresponding one or more remaining control patterns of the plurality of control patterns.

19. The method of claim 16 further comprising transmitting the output signaling for movement of the work machine and movement of a work implement of the work machine using different control devices of the plurality of control devices.

20. The method of claim 18, wherein said switching one of more of the selected set of control patterns from among corresponding one or more remaining control patterns of the plurality of control patterns, by the controller, is based on a type of the work machine, a type of the work implement, and a state of the work machine.

* * * * *